Figure 1:
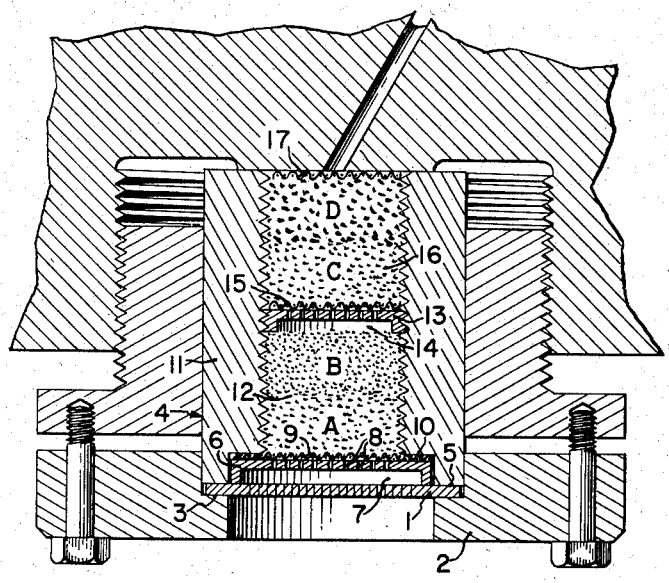

April 21, 1959  A. McGEORGE, JR  2,883,261
PROCESS FOR FILTRATION DURING MELT SPINNING
Filed Feb. 2, 1955

INVENTOR
ARTHUR McGEORGE, JR.

BY
ATTORNEY

2,883,261
PROCESS FOR FILTRATION DURING MELT SPINNING

Arthur McGeorge, Jr., Wilmington, Del., assignor to E. I. du Pont de Nemours and Company, Wilmington, Del., a corporation of Delaware Application February 2, 1955, Serial No. 485,775

3 Claims. (Cl. 18—54)

This invention relates to production of filaments, being concerned particularly with filtration of molten organic filament-forming compositions.

It is customary to filter a synthetic filament-forming composition before extruding it through a spinneret to form it into filaments. Filtration is practiced to exclude inhomogeneities capable of clogging the spinneret orifices or otherwise interrupting flow of the filament-forming composition. Of course, as a filtering medium removes inhomogeneities from a composition being filtered, the filtering medium itself is affected; for this and other reasons, the filtering medium is subject to channeling into paths of relatively easy flow and compacting to form regions where flow is more restricted. Corresponding unevenness of flow at a multi-orifice spinneret is undesirable because of consequent interfilament denier nonuniformity and, in the extreme, interruption of filaments. Flow differences, once established in a filter pack, usually persist throughout its useful life, which is shortened thereby. In the filtration of molten organic filament-forming compositions the problem has continued to exist regardless of the type of filtering medium or the degree of care taken in packing the filter.

Peculiarities of melt-spinning have prevented solution of this problem by the expedient of providing a flow-distribution space close to the spinneret itself. One reason for this is that if such a distribution space is large enough to provide sufficient lateral flow to compensate for unevenness of the flow pattern set up above in the filter pack, stagnation and other undesirable phenomena occur to such an extent that formation of additional inhomogeneities therein largely offsets any benefit from the intended cross-flow. This may occur from degradation of the molten polymer in such a space or from association of the polymeric macromolecules or of pigment particles or of any of these with one another or with other particles present in the filament-forming composition, thus clogging the spinneret.

A primary object of the present invention is effective filtration of molten organic filament-forming compositions. Another object is improved extrusion of molten organic filament-forming compositions as uniform multifilaments. Other objects of this invention will be apparent from the following description and the accompanying diagrams, in which Figure 1 is an axial cross section of a spinneret assembly having a filter packed according to the present invention and Figure 2 is a perspective view of an element of the apparatus of Figure 1.

In general, the objects of the present invention are accomplished by providing a filter containing two or more particulate filtering strata spaced apart from one another to permit cross-flow therebetween. The adjacent strata of filtering particles are separated by suitable laminar means adapted to exclude the filtering particles but to admit the molten organic filament-forming solution and to allow it to flow laterally between the strata. For effective distribution of flow in molten organic filament-forming polymers the minimum cross-flow space provided by the laminar means or by spacing means separate therefrom or integral therewith should be on the order of hundredths of an inch in depth.

Figure 2:
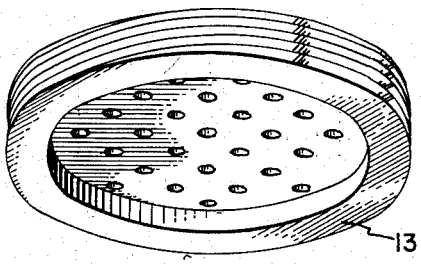

Figure 1 shows a spinneret assembly including spinneret 1, annular holder 2 having ledge 3 upon which the spinneret rests, and housing 4 whose rim 5 fits inside the holder and abuts the spinneret near its periphery. Fitting inside the rim of the housing is distribution plate 6 flanged to form distribution space 7 between perforated face 8 of the plate and the spinneret. On the opposite side of the plate from the distribution space is screen 9, which rests against shoulder 10 of the housing formed by the junction of the rim and of body 11 of the housing, which is threaded internally. The lower part of the housing body is filled with stratum 12 composed of layers A and B of particulate filtering medium, above which perforated plate 13 is threaded to a position near but out of contact with the top of the stratum, forming distribution space 14 thereabove. Screen 15 rests against the opposite face of the plate, and stratum 16 composed of layers C and D of particulate filtering medium fills the housing from there to a location near the top, where coarse screen 17 is placed to keep the top of the filtering medium level. An example of use of this kind of spinneret assembly follows.

EXAMPLE

Polyhexamethylene adipamide having relative viscosity of 40 as measured in formic acid is extruded through a spinneret assembly composed as shown in Figure 1 and described above, having the following characteristics:

Spinneret—2 inches in diameter, 3/16 inch thick with 10 orifices each 0.009 inch in diameter
Screens 9 and 15—325 mesh; screen 17—50 mesh
Plate 6—3/16 inch thick; space 7—0.09 inch deep
Plate 13—3/16 inch thick; space 14—0.05 inch deep
Layer A—3/16 inch thick, about 60–150 mesh, predominately 100–150 mesh
Layer B—3/16 inch thick, 150–200 mesh
Layer C—3/16 inch thick, about 60–80 mesh
Layer D—1/2 inch thick, about 10–65 mesh Drawn yarn of 30 denier is formed in conventional manner from the filaments spun thereby; it exhibits a tenacity of 5.8 grams per denier at elongation of 18%.

For comparison, the procedure of this example was repeated, first with elimination of the interstrata distribution space and then with elimination of both distribution spaces. The undrawn yarns prepared in these three different ways were compared for interfilament denier uniformity in the following manner. A three-inch length of yarn was cut from each sample. Each of the ten filaments from each of these was checked for denier, the average (arithmetic means) of the 10 filaments for each yarn being calculated from the individual measurements; from these were computed the standard deviation (the square root of the following: the sum of the squares of the differences of each of the measured deniers from the average denier, divided by the number of samples) and the coefficient of variation (standard deviation divided by the average). Additional samples of the same individual filaments were then dissolved separately to concentration of 8.4 percent (by weight) in formic acid and the relative viscosities therein determined. These procedures were repeated several dozen times upon different three-inch sections taken from the respective yarns; the averages of all the determinations appear in the following table.

Table

|  | Denier Coefficient of Variation (Percent) | Relative Viscosity Coefficient of Variation (Percent) |
| --- | --- | --- |
| Example | 0.018 | 0.013 |
| Control without interstrata distribution space | 0.055 | 0.04 |
| Control without any distribution space | 0.13 | 0.04 |

The results expressed in the table show that the interstrata distribution space is most essential to improved uniformity of relative viscosity and highly beneficial to uniformity of denier, revealing a threefold improvement in the former over both assemblies lacking the interstrata distribution space, and in the latter over the assembly having only a distribution space at the spinneret, which itself was only about twice as good in that characteristic as the assembly lacking any distribution space. These results are surprising because a cross-flow space would be expected to be conducive to agglomeration or gel-formation in the polymer, which would decrease the uniformity in both of the above criteria; also, addition of a supporting plate and screen to provide such a space might be expected to augment the total pressure drop through the pack, but instead reduction in pressure of as much as 20 percent has accompanied use of packs according to this invention, apparently because the cross-flow space cut down channeling in the particulate part of the pack. Two or more distribution spaces in the assembled pack are preferred because, as shown above, the results are more than simply cumulative; in addition, the useful life of the pack is lengthened thereby.

For best results, an interstrata distribution space should have an effective depth of from 0.03 to 0.08 inch, as determined by investigation of the melt-spinning of nylon aided thereby. The space should extend completely across the filter pack, i.e., perpendicular to the axis of flow through the spinneret. The openings in a distribution plate, such as plate 13 shown in side section in Figure 1 and in perspective in Figure 2, may be made small enough to prevent passage of the filtering particles; especially where the particles are small it is helpful to place a fine screen made of metal or other suitable material between the particulate medium and the plate. Alternatively, a screen of sufficient strength may replace the porous section of the plate, resting against a spacer ring like the flange of the plate to provide the distribution space or resting against a grid supported by a spacer ring. Substitution of coarse screens for the empty space provided by a spacer ring or the like may be acceptable but is often undesirable because partial obstruction of the distribution space thereby provides opportunity for stagnation of the molten solution, leading to agglomeration and production of inhomogeneities therein and necessitating additional depth to secure the desired crossflow. In a satisfactory distribution space, the radial pressure drop will not be more than a percent, or so, of the pressure drop in the filter bed upstream therefrom. For an interstrata distribution space in the filtration of most molten organic filament-forming compositions, the acceptable radial pressure drop usually will be in the range of 1 to 30 lbs. per square inch. Excessive depth of the space is undesirable, and usually one-tenth inch will prove satisfactory, more than one-half inch seldom being advantageous; any distribution space at the spinneret should be shallow enough (preferably not over 0.1 inch deep) that corresponding release of pressure therein does not provoke bubbling of previously dissolved gases, which would hinder spinning continuity.

The filtering medium usually is an ordinary pure silica sand, as that has given highly satisfactory results at very reasonable cost. Other finely divided particulate material not affected by and not affecting the molten organic filament-forming composition may be used instead of sand. In general, the filtering medium is disposed in layers, distributed as exemplified above or with grain size graduated from coarse to fine grain in the direction of flow of the filtrate, or it may be uniform throughout, or otherwise as desired. The spinneret, the housing, and the screens or plates used to retain the filtering medium, as well as any spacer rings, are made of stainless steel or other metallic or ceramic materials not reactive with the filament-forming composition. The elements may be assembled in various ways to retain the particulate filtering medium and to provide the desired distribution space or spaces; for example, two plates like plate 6 of Figure 1 may be placed back to back to form a relatively deep distribution space of precise dimensions. Other variations of assembly and use of the elements described that do not constitute a departure from the inventive concept will come readily to mind.

The claimed invention:

1. In the spinning of molten organic filament-forming compositions, the improvement comprising passing a molten organic filament-forming composition through a first stratum comprised of inert filtering particles then into a confined cross-flow space between the first stratum and a second stratum of inert filtering particles and thence through the second stratum into a cross-flow space between said stratum and the spinneret.

2. The process improvement of claim 1 in which the organic filament-forming composition is nylon and the cross-flow space through which it passes is from about 0.03 to 0.08 inch deep.

3. The process of forming synthetic filamentary material by melt spinning comprising the steps of pumping a molten organic filament-forming composition through a first stratum comprised of inert filtering particles, then into a confined cross-flow space between the first stratum and a second stratum of inert filtering particles, then through the second stratum and into a second cross-flow space between said second stratum and a spinneret, and then through the spinneret to form synthetic filamentary material.

References Cited in the file of this patent
UNITED STATES PATENTS

| | | |
| --- | --- | --- |
| 357,897 | Begemann | Feb. 15, 1887 |
| 2,266,368 | Hull et al. | Dec. 16, 1941 |
| 2,353,433 | Auberschek | July 11, 1944 |
| 2,589,870 | Sale et al. | Mar. 18, 1952 |